(12) United States Patent
Le Roy-Delage et al.

(10) Patent No.: US 8,800,656 B2
(45) Date of Patent: Aug. 12, 2014

(54) SELF-ADAPTIVE CEMENTS

(75) Inventors: Sylvaine Le Roy-Delage, Paris (FR); Laure Martin, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 291 days.

(21) Appl. No.: 13/358,481

(22) Filed: Jan. 25, 2012

(65) Prior Publication Data

US 2012/0205105 A1   Aug. 16, 2012

(30) Foreign Application Priority Data

Feb. 11, 2011   (EP) .................................... 11154152

(51) Int. Cl.
| | |
|---|---|
| *E21B 33/14* | (2006.01) |
| *C09K 8/487* | (2006.01) |
| *C04B 28/02* | (2006.01) |
| *C09K 8/467* | (2006.01) |
| *C09K 8/493* | (2006.01) |

(52) U.S. Cl.
CPC ................. *C09K 8/487* (2013.01); *C04B 28/02* (2013.01); *C09K 8/493* (2013.01)
USPC ........... 166/293; 106/671; 106/802; 106/823; 166/295; 507/219; 507/231; 507/232; 507/269; 524/8

(58) Field of Classification Search
None
See application file for complete search history.

(56) References Cited

U.S. PATENT DOCUMENTS

| | | | |
|---|---|---|---|
| 3,036,633 A * | 5/1962 | Mayhew ....................... | 166/293 |
| 4,482,379 A | 11/1984 | Dibrell et al. | |
| RE35,163 E | 2/1996 | Christensen et al. | |
| 5,518,996 A | 5/1996 | Maroy et al. | |
| 5,575,841 A | 11/1996 | Dry | |
| 5,660,624 A | 8/1997 | Dry | |
| 5,989,334 A | 11/1999 | Dry | |
| 6,261,360 B1 | 7/2001 | Dry | |
| 6,296,057 B2 | 10/2001 | Thiercelin | |
| 6,458,198 B1 | 10/2002 | Baret et al. | |
| 6,527,849 B2 | 3/2003 | Dry | |
| 6,645,288 B1 | 11/2003 | Dargaud et al. | |
| 6,832,651 B2 | 12/2004 | Ravi et al. | |
| 6,902,001 B2 | 6/2005 | Dargaud et al. | |
| 6,907,929 B2 | 6/2005 | Leroy-Delage et al. | |
| 7,341,106 B2 * | 3/2008 | Reddy et al. ................... | 166/295 |
| 7,527,095 B2 | 5/2009 | Bloess et al. | |
| 7,530,396 B1 | 5/2009 | Reddy et al. | |
| 7,578,347 B2 | 8/2009 | Bosma et al. | |
| 7,607,484 B2 * | 10/2009 | Roddy et al. ................... | 166/293 |
| 7,617,870 B1 | 11/2009 | Roddy et al. | |
| 2007/0017676 A1 | 1/2007 | Reddy et al. | |
| 2007/0137528 A1 * | 6/2007 | Le Roy-Delage et al. .... | 106/718 |
| 2007/0204765 A1 | 9/2007 | Le Roy-Delage et al. | |
| 2008/0099203 A1 | 5/2008 | Mueller et al. | |
| 2009/0071650 A1 | 3/2009 | Roddy et al. | |
| 2009/0088348 A1 | 4/2009 | Roddy et al. | |
| 2011/0120715 A1 * | 5/2011 | Le Roy-Delage et al. .... | 166/292 |

FOREIGN PATENT DOCUMENTS

| | | |
|---|---|---|
| CA | 211957 | 6/2006 |
| DE | 1206342 | 12/1965 |
| EP | 1176126 | 1/2002 |
| EP | 1129047 | 11/2002 |
| WO | 00/37387 | 6/2000 |
| WO | 01/70646 | 9/2001 |
| WO | 03/068708 | 8/2003 |
| WO | 2004/101951 | 11/2004 |
| WO | 2004/101952 | 11/2004 |
| WO | 2009/019471 | 2/2009 |
| WO | 2010/146334 | 12/2010 |

OTHER PUBLICATIONS

Bouras H et al.: "Responsive Cementing Material Prevents Annular Leaks in Gas Wells," paper SPE 116757 (2008).
Cavanagh P. et al.: "Self-Healing Cement—Novel Technology to Achieve Leak-Free Wells," paper SPE 105781 (2007).
Dry, CM: "Three designs for the internal release of sealants, adhesives and waterproofing chemicals into concrete to reduce permeability." Cement and Concrete Research 30 (2000) 1969-1977.
Le Roy-Delage S et al.: "Self-Healing Cement System—A Step Forward in Reducing Long-Term Environmental Impact," paper SPE 128226 (2010).
Roth J et al.: "Innovative Hydraulic Isolation Material Preserves Well Integrity," paper SPE 112715 (2008).
Smith D.K. et al.: "Gilsonite leads fight against lost circulation", Petroleum Engineer International, Hart Publication, US, vol. 61, No. 4, Apr. 1, 1989, pp. 42-46.

* cited by examiner

*Primary Examiner* — George Suchfield
(74) *Attorney, Agent, or Firm* — Michael Dae

(57) ABSTRACT

A self-adaptive cement formulation includes cement, water, block copolymer and asphaltite-mineral particles. The set cement demonstrates self-healing properties when exposed to methane, and is particularly suited for well-cementing applications. After placement and curing, the self-healing properties help maintain zonal isolation should bonding be disrupted between the set cement and the formation or a casing string, should cracks or defects appear in the set-cement matrix, or both.

10 Claims, 1 Drawing Sheet

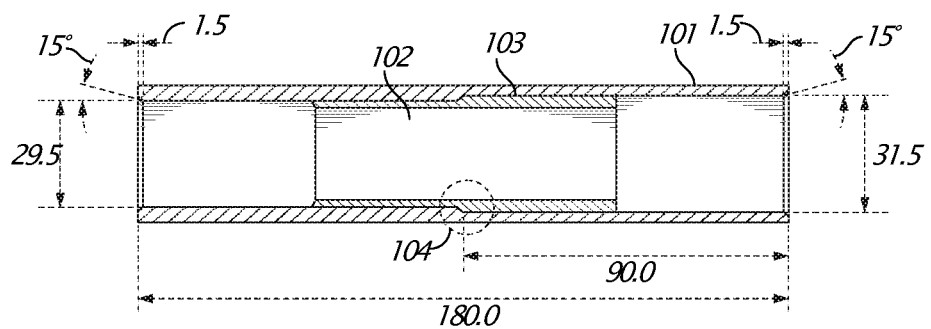

SELF-ADAPTIVE CEMENTS

CROSS REFERENCED APPLICATIONS

This application claims the benefit of the disclosure of European patent application number 11154152.0 filed on Feb. 11, 2011 incorporated by reference in its entirety.

BACKGROUND

The present disclosure relates to self-adaptive cements. In particular, the disclosure relates to set cements that are "self-healing," i.e., formulations that can adapt to compensate for changes or faults in the physical structure of the cement, or which adapt their structure after the setting phase of the cement in the cementing of oil, gas, water or geothermal wells, or the like.

During the construction of wells, cement is used to secure and support casing inside the well and prevent fluid communication between the various underground fluid-containing layers or the production of unwanted fluids into the well.

Various approaches have been developed to prevent failure of the cement sheath. One approach is to design the cement sheath to take into account physical stresses that might be encountered during its lifetime. Another approach is to include, in the cement composition, materials that improve the physical properties of the set cement. Such materials may include amorphous metal fibers to improve strength and resistance to impact damage. Flexible materials (rubber or polymers) may be added to the cement to confer a degree of flexibility on the cement sheath. Nevertheless, the above-described approaches do not allow restoration of zonal isolation once the cement sheath has actually failed due to the formation of cracks, gaps or microannuli.

A number of self-healing concretes are known for use in the construction industry. However, none of these self-healing concretes are immediately applicable to well cementing operations because of the need for the material to be pumpable during placement.

"Self-healing" cements were eventually developed for oil and gas industry applications. These formulations generally contain additives that react and/or swell upon contact with downhole fluids. When cement-sheath deterioration occurs, exposing the cement matrix or cement-sheath surfaces to downhole fluids, the additives respond and seal cracks or fissures, thereby restoring cement-matrix integrity and zonal isolation. Well cements are potentially exposed to several fluid types during service, including liquid and gaseous hydrocarbons, water, brines and/or carbon dioxide. Thus, depending on the anticipated wellbore environment, it would be desirable to incorporate additives that are able to respond to one or more types of downhole fluids.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present embodiments allow improvements by providing set cements that are self-healing when exposed to hydrocarbons, and methods by which they may be prepared and applied in subterranean wells.

In an aspect, embodiments relate to compositions comprising a settable material, at least particles of an asphaltite mineral, thermoplastic block copolymers particles and sufficient water to form a pumpable slurry. The preferred block copolymers include (but are not limited to) styrene-butadiene-styrene and styrene-isoprene-styrene and combinations thereof. The preferred asphaltite minerals include (but are not limited to) unitaite, unitahite or both. The settable material may comprise (but would not be limited to) Portland cement, microcement, geopolymers, resins, mixtures of cement and geopolymer, plaster, lime-silica mixtures, phosphomagnesium cements and chemically modified phosphate ceramics.

In a further aspect, embodiments relate to methods for maintaining zonal isolation in a subterranean well that penetrates one or more hydrocarbon-containing formations. A composition is placed in the well that comprises a settable material, at least particles of an asphaltite mineral, thermoplastic block-copolymer particles and sufficient water to form a pumpable slurry. Should microannuli, cracks or defects occur in the cement sheath after setting, allowing hydrocarbons from the formation to contact the particles, the particles will swell and enable the cement sheath to self-repair.

In yet a further aspect, embodiments relate to methods for cementing a subterranean well that penetrates one or more hydrocarbon-containing formations. A composition is placed in the well that comprises a settable material, at least particles of an asphaltite mineral, thermoplastic block-copolymer particles and sufficient water to form a pumpable slurry. The slurry may be placed during a primary or a remedial cementing operation.

BRIEF DESCRIPTION OF THE DRAWINGS

FIG. 1 is a schematic diagram of a tube for exposing fractured cement samples to a flowing gas, and measuring the effect of gas exposure on flow-rate reduction.

DETAILED DESCRIPTION

At the outset, it should be noted that in the development of any such actual embodiment, numerous implementations—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific points, it is to be understood that inventors appreciate and understand that any and all data points within the range are to be considered to have been specified, and that inventors possessed knowledge of the entire range and all points within the range.

In an aspect, embodiments relate to compositions for cementing subterranean wells, comprising a settable material, water and at least one additive that swells in the event of structural failure of or damage to the set material (i.e., the cement sheath). Such behavior restores and maintains a physical and hydraulic barrier in the failure zone. As a result, zonal isolation in the subterranean well is preserved. Such set cements are said to be "self-healing" or "self-repairing." In the following disclosure, both terms are used interchangeably, and are to be understood as the capacity of a cement sheath to restore hydraulic isolation after suffering a matrix-permeability increase, structural defects such as cracks or fissures, or debonding from casing or formation surfaces (i.e., microannuli).

Examples of settable materials include (but are not limited to) Portland cement, microcement, geopolymers, resins, mixtures of cement and geopolymer, plaster, lime-silica mixtures, phosphomagnesium cements and chemically bonded phosphate ceramics (CBPCs).

Self-healing set cements that operate in an environment containing high concentrations of gaseous hydrocarbons, methane in particular, would be beneficial to the industry. The Applicants have determined that self-healing properties may be achieved in this environment by incorporating mixtures of thermoplastic block-polymer particles and asphaltite-mineral particles in the formulation.

Typical block polymers comprise alternating sections of one chemical compound separated by sections of a different chemical compound, or a coupling group of low molecular weight. For example, block polymers can have the structure (A-b-B-b-A), wherein A represents a block that is glassy or semi-crystalline and B is a block that is elastomeric. In principle, A can be any polymer that is normally regarded as thermoplastic (e.g., polystyrene, polymethylmethacrylate, isotactic polypropylene, polyurethane, etc.), and B can be any polymer that is normally regarded as elastomeric (e.g., polyisoprene, polybutadiene, polyethers, polyesters, etc.). Preferred thermoplastic block polymers include styrene-isoprene-styrene (SIS), styrene-butadiene-styrene (SBS) and mixtures thereof. The block-polymer-additive may be in one or more shapes, including (but not limited to) spherical, ovoid, fibrous, ribbon-like and in the form of a mesh.

Asphaltite minerals are hard, solid bitumens whose chief consituents, asphaltenes, have very large molecules. They are typically dark brown to black in color. Common asphaltites include (but are not limited to) uintaite, unitahite (both of which are usually sold as Gilsonite™ from American Gilsonite Company, Bonanza, Utah, USA.), glance pitch and grahamite. Of these, unitaite and unitahite are preferred.

In a further aspect, embodiments relate to methods for maintaining zonal isolation in a subterranean well having a borehole that penetrates one or more hydrocarbon-containing formations. The methods comprise placing a composition in the well comprising a settable material, at least particles of an asphaltite mineral, thermoplastic block-copolymer particles and sufficient water to form a pumpable slurry. The slurry is then allowed to form a cement sheath. Those skilled in the art will recognize that a cement slurry is generally considered to be pumpable when its viscosity is less than or equal to 1000 mPa-s at a shear rate of 100 s$^{-1}$ throughout the temperature range the slurry will experience during placement in the well. The cement sheath may be located between the well casing and the borehole wall, or between the casing and another casing string. If microannuli, cracks or defects occur in the cement sheath, the casing-cement interface or the cement-borehole wall interface, the particles will be exposed to formation hydrocarbons, causing them to swell and enabling the cement sheath to have self-healing properties.

In yet a further aspect, embodiments relate to methods for cementing a subterranean well having a borehole that penetrates one or more hydrocarbon-containing formations. The methods comprise placing a composition in the well comprising a settable material, at least particles of an asphaltite mineral, thermoplastic block-copolymer particles and sufficient water to form a pumpable slurry. The cement sheath may be located between the well casing and the borehole wall, or between the casing and another casing string. If microannuli, cracks or defects occur in the cement sheath, the casing-cement interface or the cement-borehole wall interface, the particles will be exposed to formation hydrocarbons, causing them to swell and enabling the cement sheath to have self-healing properties.

For all aspects of the disclosure, the tensile strength of the block polymer may be varied between (but is not limited to) about 1.5 MPa and 40 MPa, preferably between 3.4 to 34 MPa. Even more preferred tensile strengths may be between 2 MPa and 3.45 MPa or between 28 MPa and 34 MPa.

The concentration of the thermoplastic block-polymer and asphaltite-mineral particle mixture is preferably between about 10% and 75% by volume of solids in the cement slurry, also known as percentage by volume of blend (BVOB). A more preferred particle concentration lies between about 20% and 50% BVOB. The volume-ratio range between the thermoplastic block-polymer particles and the asphaltite-mineral particles in the mixture is preferably between 10:90 and 90:10. The particle-size range is preferably between about 50 μm and 900 μm, and more preferably between about 90 μm and 800 μm. The particles may be added as spheres, ovoid particles, fibers, meshes or ribbons.

One of the current challenges that the industry is facing is the presence in some wells of high concentration of gaseous hydrocarbons such as methane, propane and/or ethane. Such gaseous hydrocarbons are much more volatile than those in liquid form, and have the tendency to penetrate the failures and/or microannuli that can be present in the cement sheath, thereby modifying the pressure and safety conditions of the well as the integrity is diminished. The inventors have determined that the compositions according to the present disclosure can solve this problem, even in the presence of very high concentrations of gaseous hydrocarbon. In a preferred embodiment, the gaseous-hydrocarbon concentration in the hydrocarbon fluid is at least 80 mol %, and more preferably above about 91 mol %. In addition, the hydrocarbon pressure to which the cement sheath is exposed is preferably above about 3.5 MPa, more preferably above about 5.5 MPa and most preferably above about 15 MPa. Pressures as high as 200 MPa may even be envisaged, preferably 100 MPa.

The thermoplastic block-polymer particles and asphaltite-mineral particles may be further encapsulated by a protective layer. The layer may rupture or degrade upon exposure to one or more triggers, including (but not limited to) contact with a hydrocarbon, propagation of a crack within the set-cement matrix, time and temperature.

In addition to the thermoplastic block-polymer particles and asphaltite-mineral particles, the cement slurries may also comprise customary additives such as retarders, accelerators, extenders, fluid-loss-control additives, lost-circulation additives, gas-migration additives, gas-generating additives and antifoam agents. Furthermore, the cement slurries may contain additives that enhance the flexibility and/or toughness of the set cement. Such additives include (but are not limited to) flexible particles having a Young's modulus below about 5000 MPa and a Poisson's ratio above about 0.3. Preferably, such particles would have a Young's modulus below about 2000 MPa. Examples include (but are not limited to) polypropylene, polyethylene, acrylonitrile butadiene, styrene butadiene and polyamide. Such additives may also include fibers selected from the list comprising polyamide, polyethylene and polyvinyl alcohol. Metallic microribbons may also be included.

The thermoplastic block-polymer particles and asphaltite-mineral particles may also be used in engineered-particle-size cement formulations involving trimodal or quadrimodal blends of small, medium and coarse particles. Such formulations are exemplified in U.S. Pat. No. 5,518,996 and/or CA 2,117,276 incorporated herein by reference in their entirety. The cement compositions preferably have densities between about 1200 and 1600 kg/m$^3$, and solid-volume fractions (SVF) between about 45-58%. If necessary, the slurry densities may be further decreased to about 1050 kg/m$^3$ by adding any known low-specific-gravity additives, preferably hollow ceramic or glass microspheres and mixtures thereof.

The thermoplastic block-particles and asphaltite-mineral particles may also be employed in cement compositions that comprise an external phase comprising water, a hydraulic cement and one or more particulate materials that swell upon contact with a water immiscible fluid such as a hydrocarbon. The internal phase of such systems is typically a water-immisicible fluid.

The thermoplastic block-particles and asphaltite-mineral particles may be further associated with one or more compounds from the list comprising an aqueous inverse emulsion of polymer comprising a betaine group, poly-2,2,1-bicyclo heptene (polynorbornene), alkylstyrene, crosslinked substituted vinyl acrylate copolymers, diatomaceous earth, natural rubber, vulcanized rubber, polyisoprene rubber, vinyl acetate rubber, polychloroprene rubber, acrylonitrile butadiene rubber, hydrogenated acrylonitrile butadiene rubber, ethylene propylene diene monomer, ethylene propylene monomer rubber, styrene-butadiene rubber, styrene/propylene/diene monomer, brominated poly(isobutylene-co-4-methylstyrene), butyl rubber, chlorosulphonated polyethylenes, polyacrylate rubber, polyurethane, silicone rubber, brominated butyl rubber, chlorinated butyl rubber, chlorinated polyethylene, epichlorohydrin ethylene oxide copolymer, ethylene acrylate rubber, ethylene propylene diene terpolymer rubber, sulphonated polyethylene, fluoro silicone rubbers, fluoroelastomers, substituted styrene acrylate copolymers and bivalent cationic compounds.

The cement compositions may also comprise fibers or ribbons selected from the list comprising polyamide, polyethylene, polypropylene, polyvinyl alcohol and metallic compounds. Other fibers known by those skilled in the art may be incorporated.

Those skilled in the art will appreciate that the disclosed methods may not necessarily be applied throughout the entire length of the subterranean interval being cemented. In such cases, more than one cement-slurry composition is placed sequentially. The first slurry is called the "lead," and the last slurry is called the "tail." Under these circumstances, it is preferred that the disclosed slurry be placed such that it resides in regions where hydrocarbons exist. Those skilled in the art will also appreciate that the disclosed method and use would not only be useful for primary cementing, but also for remedial cementing operations such as squeeze cementing and plug cementing. Such remedial operations may or may not involve pumping the cement slurry. Instead, other placement means including (but not limited to) dump bailers may be employed. Also, hydrocarbons might be injected into the borehole to contact the cement sheath thus triggering the swelling of the particles that will then repair any defect of said cement sheath.

EXAMPLE

The following example serves to further illustrate the disclosure.

Various cement formulations containing a mixture of swelling particles—unitaite and styrene-isoprene-styrene (SIS)—were evaluated for their self-healing properties at ambient temperature and pressure. The unitaite was Gilsonite™ from American Gilsonite Company, Bonanza, Utah, USA. Gilsonite™ has with a specific gravity of 1.007 as measured by a pycnometer. The particle-size distribution was as follows: D[0.1]=13.0 μm; D[0.5]=94.8 μm; D[0.9]=579.7 μm. Two SIS polymers were evaluated, and their compositions and properties are presented in Table 1. Both polymers were obtained from Kraton Polymers, Houston, Tex., USA.

TABLE 1

Properties of SIS polymers employed in example.*

| Product Name | D1114P | D1119 |
|---|---|---|
| Density (kg/m$^3$) | 0.92 | 0.93 |
| Styrene/Rubber ratio typical value | 19/81 | 22/78 |
| Tensile strength at break (MPa/psi) | 31.7/4600 | 2.4/350 |
| 300% Modulus (MPa/psi) | 1.1/160 | 1.9/270 |
| Elongation at break (%) | 1300 | 1000 |

*Test Methods: ASTM D412 (tensile strength, 300% modulus and elongation at break) ASTM D4025 (density measurement) ASTM 2240 (hardness)

The cement compositions are shown in Table 2. The weighting agent was manganese tetraoxide. The additive compositions were as follows: antifoam agent: dimethyl siloxanes and silicones; dispersant: polynapthalene sulfonate; antisettling agent: 90% crystalline silica, 10% polysaccharide biopolymer (diutan gum for concentration number followed by "**"). The swelling-particle concentrations may be expressed as a percentage by volume of the cement blend (BVOB).

TABLE 2

Slurry compositions for self-healing tests.

| | | Cement with Gilsonite ™ and SIS | | | | |
|---|---|---|---|---|---|---|
| | Unit | Design 1 | Design 2 | Design 3 | Design 4 | Design 5 |
| Slurry Density | (kg/m$^3$) | 1606 | 1737 | 1737 | 1606 | 1606 |
| Solid Volume Fraction (SVF) | (%) | 50 | 53 | 53 | 50 | 50 |

TABLE 2-continued

Slurry compositions for self-healing tests.

| | | Cement with Gilsonite ™ and SIS | | | | |
|---|---|---|---|---|---|---|
| | Unit | Design 1 | Design 2 | Design 3 | Design 4 | Design 5 |
| Gilsonite ™ | (kg/m³) | 110 | 124 | 124 | 112 | 113 |
| SIS Particle | (kg/m³) | 107 | 113* | 114 | 102 | 102 |
| Cement | (kg/m³) | 689 | 773 | 772 | 686 | 690 |
| Silica | (kg/m³) | 199 | 0 | 0 | 201 | 203 |
| Weighting agent | (kg/m³) | 0 | 254 | 254 | 0 | 0 |
| Water | (kg/m³) | 490 | 457 | 457 | 494 | 491 |
| Antifoam Agent | (kg/m³) | 4.7 | 5.3 | 5.3 | 3 | 3.1 |
| Dispersant | (kg/m³) | 2.3 | 6.5 | 6.5 | 3 | 3.0 |
| Antisettling Agent | (kg/m³) | 2.2 | 3.8 | 3.8 | 4 | 0.4** |

*SIS Particle: D1114P; all others D1119

Each cement slurry was prepared according to the method described in the following publication: "Petroleum and Natural Gas Industries—Cements and Materials for Well Cementing—Part 2: Testing of Well Cements," International Organization for Standards Publication No. 10426-2. The samples were prepared in the manner required to perform a Brazilian tensile-strength test. This test is also described in ISO Publication 10426-2. The cement-core samples were 66 mm long and 22 mm in diameter. Most samples were cured at room temperature and atmospheric pressure for seven days. One sample was cured at 20.7 MPa (3000 psi) and 50° C.

The samples were fractured by the Brazilian method, then transferred to a steel tube and secured by a sealing cement. As shown in FIG. 1, the steel tube 101 is 180 mm long. There are two 90-mm sections—one with an internal diameter of 31.5 mm in diameter, the other with an internal diameter of 29.5 mm. The fractured cement sample 102 is placed inside the tube and the sealing cement 103 is applied around the sample. Midway along the cement sample, owing to the different tube diameters, there is an edge 104 to prevent the cement sample from sliding.

The composition of the sealing cement was a 1.88-kg/m³ Portland cement slurry containing 2.7 mL/kg polynaphthalene sulfonate dispersant, 2.7 mL/kg polysiloxane antifoam agent, 178 mL/kg styrene butadiene latex and 2.1% by weight of cement calcium chloride accelerator.

Nitrogen was injected into the tube at ambient temperature (20°-23° C.) and between 3 bar (43 psi) and atmospheric pressure. The baseline nitrogen flow rate was measured. Butane was then injected through the fractured samples at ambient temperature and pressure for two hours. Nitrogen was again introduced into the cell and the flow rate was measured. The flow-rate reduction was proportional to the fracture closure arising from particle swelling. The results, shown in Table 3, indicate that good self-healing properties were observed with systems based on a combination of Gilsonite™ and SIS.

TABLE 3

Self-healing performance of cement systems containing Gilsonite ™ and SIS particles.

| Design | Curing Pressure (MPa/psi) | Curing Temperature (° C.) | Injection duration (hr:min) | Crack closure (%) |
|---|---|---|---|---|
| 1 | 0.096/14 | ambient | 4:45 | 88% |
| 2 | 0.096/14 | 40 | 4:00 | 87% |
| 3 | 0.096/14 | 40 | 4:30 | 91% |
| 4 | 20.7/3000 | 50 | 2:20 | 93% |
| 5 | 0.096/14 | ambient | 4:20 | 92% |

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

The invention claimed is:

1. A method for cementing a subterreanean well in which a borehole penetrates one or more hydrocarbon-containing formations, comprising:
    (i) placing into the well a composition comprising a settable material, at least particles of an asphaltite mineral, styrene-isoprene-styrene block copolymer particles and sufficient water to form a pumpable cement slurry; and
    (ii) allowing the cement slurry to set and form a cement sheath.

2. A method for maintaining zonal isolation in a subterranean well in which a borehole penetrates one or more hydrocarbon-containing formations, comprising:
    (i) placing into the well a composition comprising a settable material, at least particles of an asphaltite mineral, styrene-isoprene-styrene block copolymer particles and sufficient water to form a pumpable cement slurry; and
    (ii) allowing the cement slurry to set and form a cement sheath;
    wherein, should microannuli, cracks or defects occur in the cement sheath, allowing hydrocarbons from the formation to contact the particles, allowing the particles to swell, and enabling the cement sheath to self-repair.

3. The method of claim 2, wherein the hydrocarbon comprises at least 80 mol % gaseous hydrocarbon.

4. The method of claim 2, wherein the hydrocarbon pressure to which the set cement is exposed is higher than about 3.5 MPa.

5. The method of claim 2, wherein the asphaltite mineral comprises uintaite, or unitahite or both.

6. The method of claim 2, wherein the combined concentration of asphaltite mineral particles and styrene-isoprene-styrene block-copolymer particles is between about 10% and 75% by volume of cement-slurry solids.

7. The method of claim 2, wherein the volume ratio between the asphaltite-mineral particles and the styrene-isoprene-styrene block-polymer particles is between 10:90 and 90:10.

8. The method of claim 2, wherein the size of the asphaltite mineral particles and styrene-isoprene-styrene block-copolymer particles is between about 50 µm and 900 µm.

9. The method of claim 2, wherein the particles are coated by a protective layer.

10. The method of claim 2, wherein the composition further comprises an aqueous inverse emulsion of polymer comprising a betaine group, poly-2,2,1-bicyclo heptene (polynorbornene), alkylstyrene, crosslinked substituted vinyl acrylate copolymers, diatomaceous earth, natural rubber, vulcanized rubber, polyisoprene rubber, vinyl acetate rubber, polychloroprene rubber, acrylonitrile butadiene rubber, hydrogenated acrylonitrile butadiene rubber, ethylene propylene diene monomer, ethylene propylene monomer rubber, styrene-butadiene rubber, styrene/propylene/diene monomer, brominated poly(isobutylene-co-4-methylstyrene), butyl rubber, chlorosulphonated polyethylenes, polyacrylate rubber, polyurethane, silicone rubber, brominated butyl rubber, chlorinated butyl rubber, chlorinated polyethylene, epichlorohydrin ethylene oxide copolymer, ethylene acrylate rubber, ethylene propylene diene terpolymer rubber, sulphonated polyethylene, fluoro silicone rubbers, fluoroelastomers, substituted styrene acrylate copolymers or bivalent cationic compounds, or combinations thereof.

\* \* \* \* \*